UNITED STATES PATENT OFFICE.

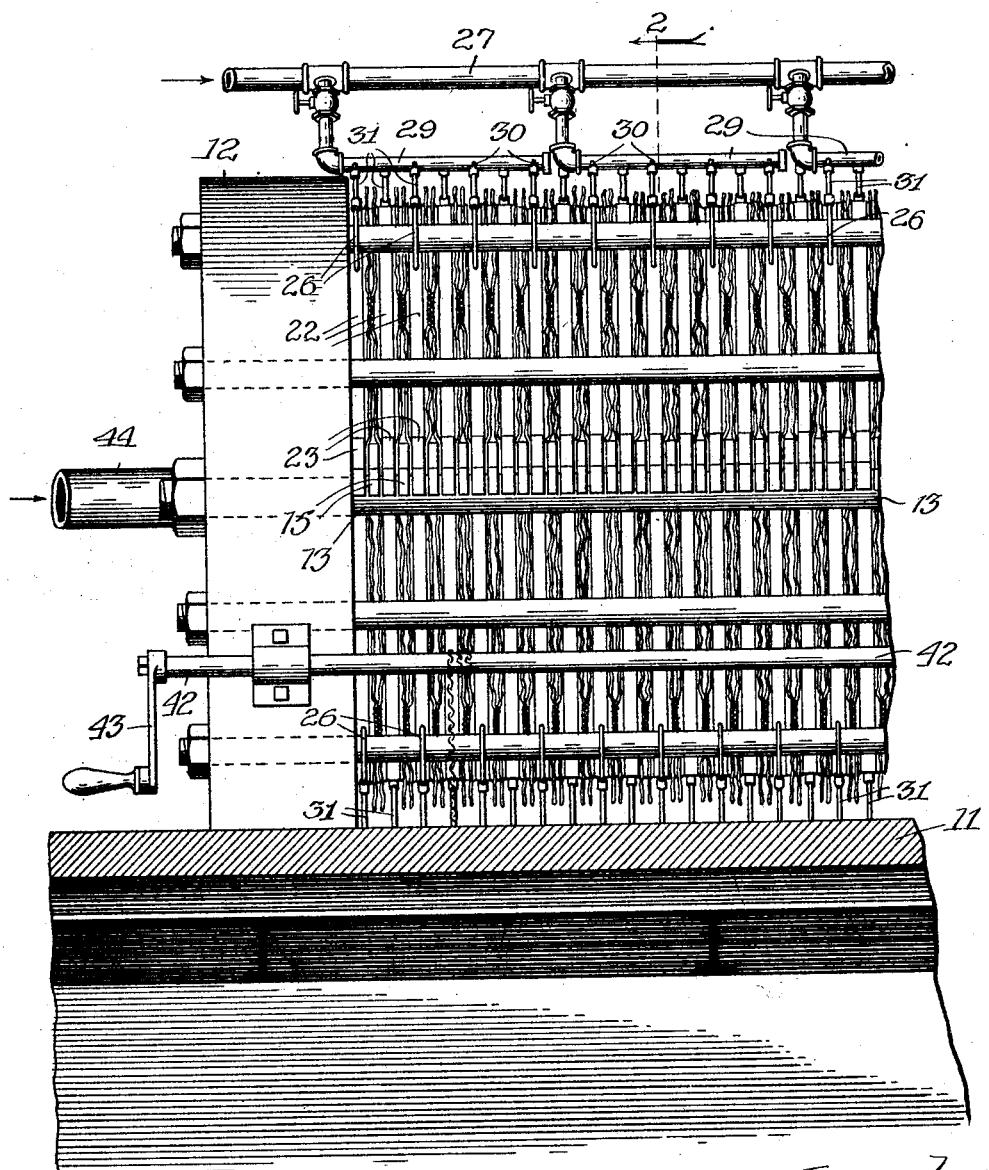

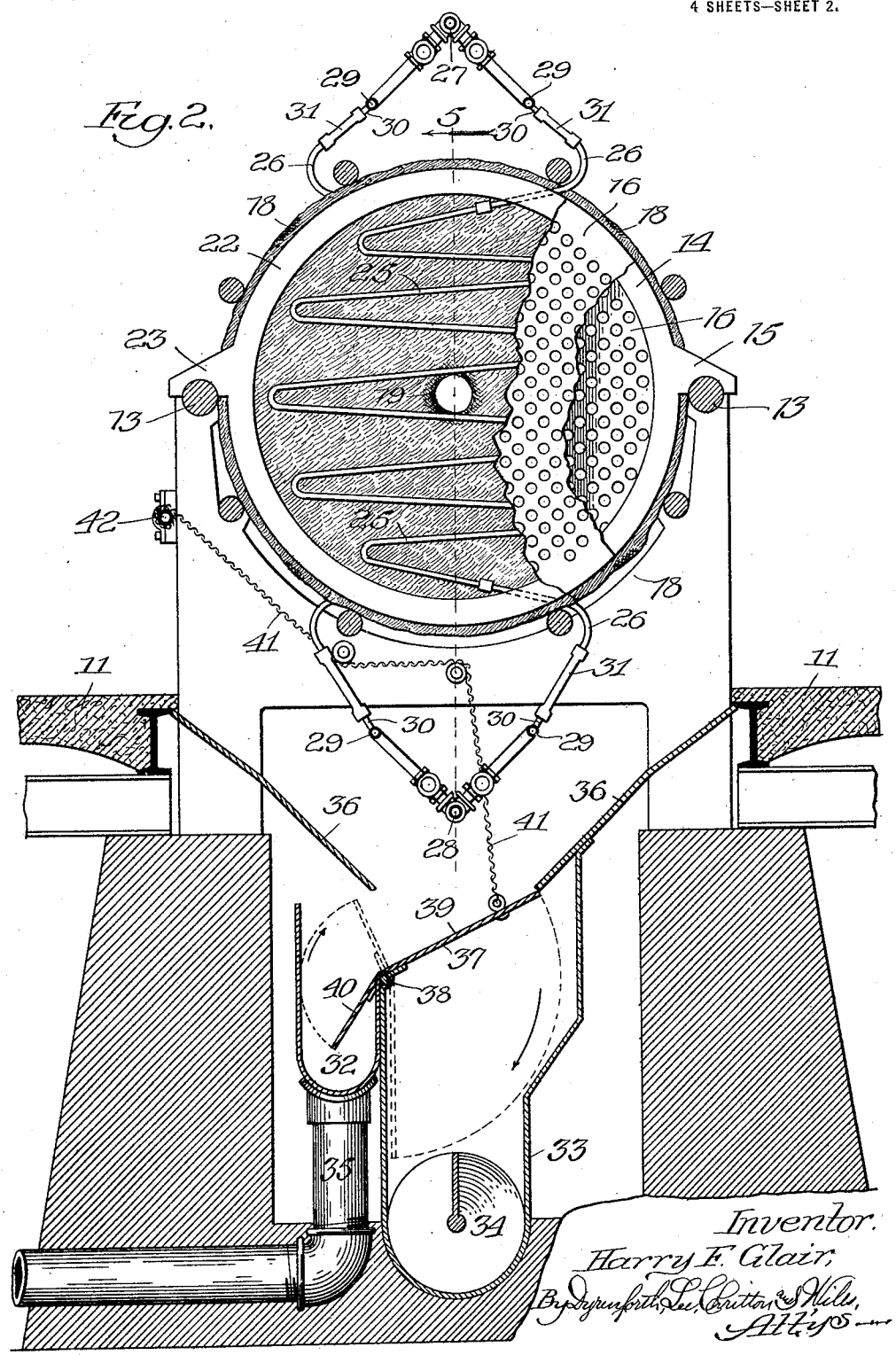

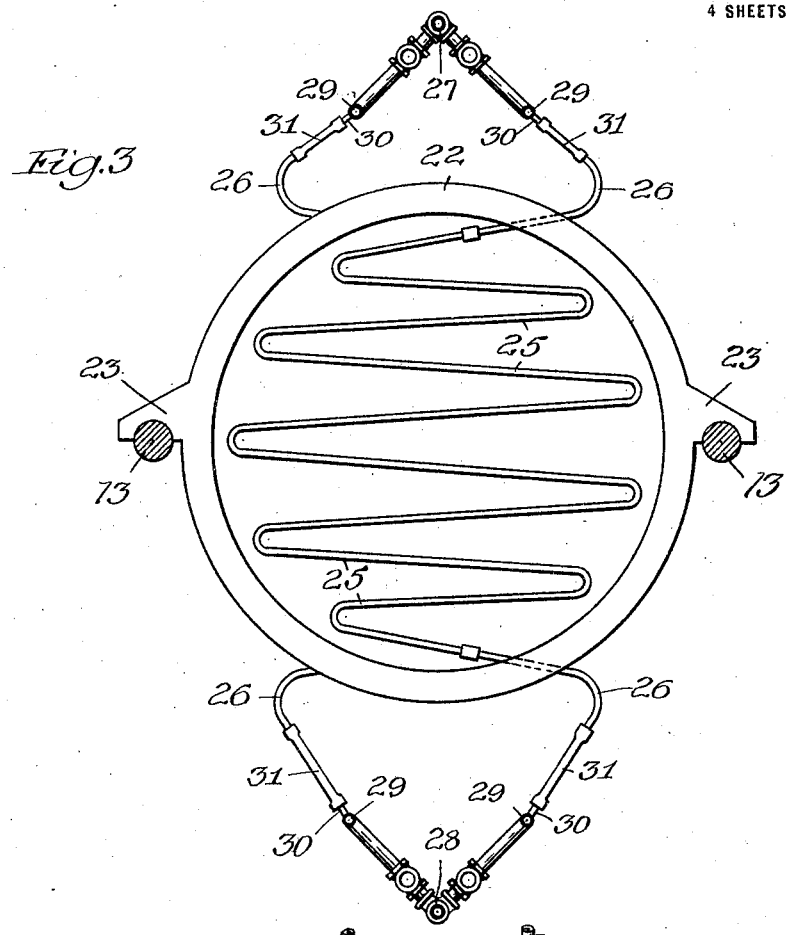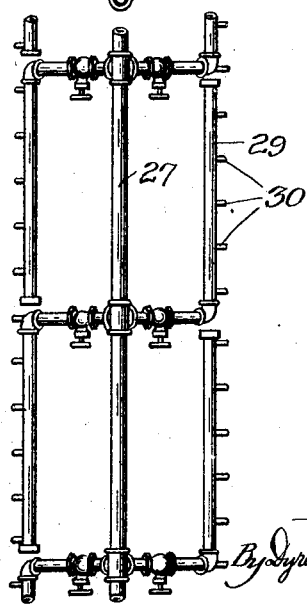

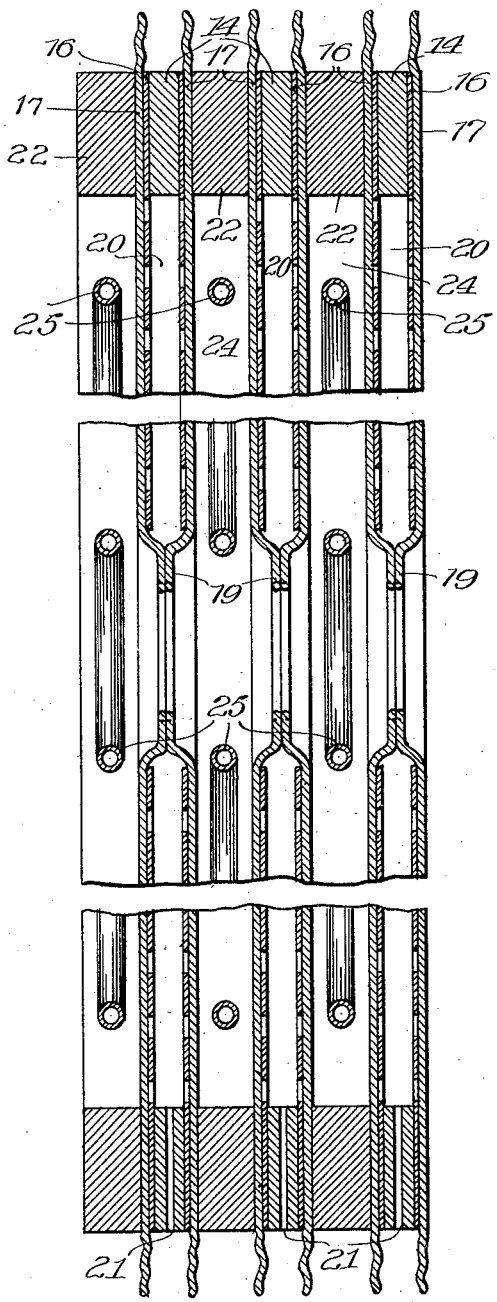

HARRY F. GLAIR, OF WHITING, INDIANA, ASSIGNOR TO STANDARD OIL COMPANY (OF INDIANA), OF WHITING, INDIANA, A CORPORATION OF INDIANA.

ART OF FILTRATION.

1,392,758.  Specification of Letters Patent.  Patented Oct. 4, 1921.

Application filed August 11, 1920. Serial No. 402,810.

*To all whom it may concern:*

Be it known that I, HARRY F. GLAIR, a citizen of the United States, residing at Whiting, in the county of Lake and State of Indiana, have invented a new and useful Improvement in the Art of Filtration, of which the following is a specification.

The present invention relates to the art of filtration, and more particularly to the filtration of paraffin wax or other wax or fusible substance from chilled oil or other vehicle. It will be fully understood from the following description thereof, illustrated by the accompanying drawing, in which:

Figure 1 is an elevation of the end portion of a filter press, showing a construction adapted for use in connection with the present invention;

Fig. 2 is a transverse section through the press shown in Fig. 1, one of the filter faces being shown in elevation, and partially broken away;

Fig. 3 is a detail elevation of a ring provided with a heating element used in connection with the present invention, and showing the means of its connection with the manifolds supplying the heating medium and its support within the filter press;

Fig. 4 is a detailed view showing the arrangement of manifolds for the heating medium; and Fig. 5 is a vertical sectional view on the line 5—5 of Fig. 2, through the filter press plates.

Referring more particularly to the drawings, the numeral 10 indicates a filter press resting upon a suitable floor or foundation 11 and provided with a plurality of filter plates and spacing rings retained under pressure between a fixed standard 12 at one end and a movable standard or plate (not shown) at the other. The various movable plates and elements making up the filter press construction are supported vertically upon the longitudinally extending rails 13.

The filter press body is made up of a series of filter members, each of which comprises two filter surfaces with a space between from which filtered material is drained, alternating with separating rings forming spaces into which the oil to be filtered is introduced and in which the wax is deposited. As shown most clearly in Figs. 2 and 5, the filter supporting members comprise a ring 14, provided at each side with a projection 15 by which it is supported upon the rails 13, 13, and upon each side of the ring 14 is attached a perforated metal disk 16, having imperforate edges and provided centrally with enlarged alined openings. The filters, consisting of heavy canvas or duck cloths, 17, 17, are supported upon the metal plates 16, 16, the filter cloths upon the two sides of the support formed by these plates being sewed together at intervals around the outer edges of the ring, as shown at 18, and likewise within the openings in the metal plate 16 as indicated at 19. The central openings in the filter cloths permit free passage of oil through the device, the sewing together of the cloth around the central opening, as indicated at 19, preventing admission of unfiltered oil into the space 20 between the filters within the ring 14. Each of the rings 14 is provided with a suitable drainage opening 21, through which filtered oil may flow out of the space 20 within the ring 14.

The respective filter bodies formed by the rings 14, the perforated metal supports 16 and the filters 17 are spaced apart by rings 22, likewise mounted upon the rails 19 by means of suitable lateral projections 23, 23. The use of these rings 22 provides spaces 24, 24 between the opposite filter faces of successive filter plates, into which spaces the oil may freely flow as hereinafter described, and in which spaces the filtered wax is deposited upon the surfaces of the filters 17, 17. As shown most clearly in Figs. 3 and 5, coils 25 are provided within the spaces 24, being secured to the spacing rings 22, the ends of these coils passing through suitable openings drilled in the rings 22 and being suitably bent as indicated at 26 into position for convenient connection with manifolds by which heating and cooling media may be supplied.

In order to supply and remove the heating or cooling medium the manifolds or headers 27 and 28 extend longitudinally of the press above and below it respectively. At regularly spaced intervals, sub-headers 29, 29 branch off from the main headers 27 and 28 and extend parallel thereto.

These sub-headers 29, 29 are provided with nipples 30, from which connection is made to the curved portions 26 of the coils 25 outside of the ring 22, for example, by means of suitable flexible connectors 31, 31. The manifolds 26 and the sub-headers and connections therewith serve for the supply of the heating or cooling medium, and the lower header 28 with its various connections serves for the withdrawal or removal of the heating or cooling medium.

Removal of wax and oil after these materials have passed out of the filter press is effected by the means most clearly indicated in Fig. 2. A well is formed below the filter press, in which are provided two adjacent longitudinally extending troughs 32 and 33, the former of which serves for conveying away filtered oil and the latter for conveying away the slack wax filtered from the oil in the press. To facilitate this removal, the trough 33 may be suitably provided with a screw conveyer 34. The filtered oil passing out of the trough 32 is conveyed away through the pipe 35. Longitudinally extending inclined plates 36, 36 below the filter press serve to guide the oil or wax passing out of the press, as the case may be, to the movable angular deflector 37, by which the material is guided to the proper trough. This angular deflector 37 is pivoted at 38, and has two angularly disposed sections 39 and 40, the former of which serves, when in the position indicated in full lines in Fig. 2, to guide the material coming from the press into the trough 32, and the latter, when in the position shown in dotted lines in Fig. 2, to guide the material coming from the filter press into the wax trough 33. The movable deflector 37 is operated by means of cables 41, which are attached to the longitudinally extending rotatable shaft 42 operable by crank 43.

In operation, chilled oil containing the paraffin wax in suspension is conveyed into the filter press through the supply pipe 44. It enters and fills the press, passing through the central openings through the filter cloths 17, and filling the spaces 24, 24 throughout the press between the filter plates. The oil is forced through the filter cloths 17 into the spaces 20 between them, the cloths being supported substantially uniformly over their entire surfaces by the plates 16, and the pressure or head of the oil over the filtering surfaces being approximately the same at all points. From the spaces 20 the filtered oil drains through the openings 21 out of the press, being guided by the plates 36, 36 and the deflector 37 into the oil trough 32. The wax filtered out from the oil deposits in the spaces 24, 24 between the filter plates. As soon as these spaces become substantially filled with slack wax the supply of chilled oil is cut off. Steam is then admitted into the header 27 through a suitable cock controlling the same, from which it passes into the various subheaders 29 and from them into the coils 25 in the wax spaces or chambers 24. The steam thus introduced melts the wax contained in these chambers, which after melting, flows through the filter cloths 17 into the spaces 20 within the filter plate and from there out of the press through the openings 21. The melted wax is guided by the plate 36 and the deflector 37 into the wax trough 33, out of which it is conveyed by the conveyer 34. The issuing steam and condensate therefrom are withdrawn through the header 28. After the wax has been removed from the press, chilled oil may be immediately introduced as in the manner above described, in which case the oil which is initially passed through and which serves to chill the press must be again chilled and passed through the press, or the press may be initially cooled by passing cold oil, preferably filtered, through the header 27, the coils 25 and out through the header 28 before introducing the chilled oil for filtration through the main pipe 44.

Although the present invention has been described in connection with a specific example of its operation and a construction capable of carrying out the same, it is not intended that the details so set forth shall be regarded as limitations on the scope of the invention, except in so far as included in the accompanying claims.

I claim:

1. The improvement in the art of filtering wax from chilled oil which consists in forming a filter cake of wax upon a uniformly supported filter surface, applying heat to the body of wax *in situ* and removing the melted wax.

2. The improvement in the art of filtering wax from chilled oil which consists in forming a filter cake of wax upon a uniformly supported filter surface, applying heat to the wax cake while positioned upon the filter surface and removing the melted wax.

3. The improvement in the art of filtering wax from chilled oil which consists in forming a filter cake of wax upon a uniformly supported filter surface, applying heat to the body of wax while positioned upon the filtering surface and removing the melted wax through the filtering surface.

4. The process of filtering wax from chilled oil which consists in forcing the chilled oil through a filter surface, the pressure or head of oil upon said surface being substantially uniformly applied thereover, thereby depositing the wax suspended in the oil upon the filter surface, applying heat to the body of wax upon the filter surface, and removing the melted wax through the latter.

5. The improvement in the art of filtering wax from chilled oil which consists in forming a body of wax upon a filter surface, applying dry heat to said body of wax while positioned upon the filter surface and removing the melted wax from said surface.

6. The process of filtering wax from chilled oil which consists in passing the oil simultaneously through a plurality of uniformly supported filter surfaces, simultaneously applying heat to the bodies of wax thus formed upon said filter surfaces while in position thereupon, and removing the wax through said filtered surfaces, cooling the filter surfaces to the temperature of the chilled oil and again passing chilled oil therethrough.

7. The improvement in the art of filtering wax from chilled oil which consists in forcing chilled oil through a uniformly supported filter surface, thereby depositing a cake of wax thereupon, applying heat to the body of wax to melt the same, removing the melted wax through the filter surface, cooling the filter surface after removal of the melted wax to substantially the temperature of the chilled oil and repeating the cycle of operations.

HARRY F. GLAIR.